United States Patent
Dalrymple et al.

(10) Patent No.: US 8,532,089 B2
(45) Date of Patent: Sep. 10, 2013

(54) CALL INTERCEPT FOR VOICE OVER INTERNET PROTOCOL (VOIP)

(75) Inventors: Tim Dalrymple, Columbia, MD (US); Jeffrey Evans, Lovettsville, VA (US); Susan Middleswarth, Silver Spring, MD (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1071 days.

(21) Appl. No.: 12/050,458

(22) Filed: Mar. 18, 2008

(65) Prior Publication Data

US 2009/0238169 A1 Sep. 24, 2009

(51) Int. Cl.
*H04L 12/66* (2006.01)

(52) U.S. Cl.
USPC .......................................................... 370/352

(58) Field of Classification Search
USPC ............. 379/201.01, 221.13, 142.01, 127.01, 379/35, 219, 201.02, 213.01, 142.08, 88.19, 379/205.01, 142.06, 32.01, 215.01, 265.02; 719/316; 370/252, 352, 389; 455/414.1
See application file for complete search history.

(56) References Cited

U.S. PATENT DOCUMENTS

| | | | |
|---|---|---|---|
| 6,459,780 B1 | 10/2002 | Wurster et al. | |
| 6,535,596 B1 * | 3/2003 | Frey et al. | 379/201.01 |
| 6,639,981 B1 * | 10/2003 | Dunn et al. | 379/221.13 |
| 6,697,461 B1 | 2/2004 | Middleswarth et al. | |
| 6,807,259 B1 * | 10/2004 | Patel et al. | 379/142.01 |
| 7,092,493 B2 * | 8/2006 | Hou et al. | 379/35 |
| 7,103,163 B1 * | 9/2006 | Cook | 379/142.06 |
| 7,298,833 B2 * | 11/2007 | Klein et al. | 379/201.02 |
| 7,769,146 B1 * | 8/2010 | Weaver et al. | 379/88.17 |
| 7,912,193 B2 * | 3/2011 | Chingon et al. | 379/142.08 |
| 7,978,620 B2 * | 7/2011 | Seetharaman et al. | 370/252 |
| 2002/0136384 A1 * | 9/2002 | McCormack et al. | 379/215.01 |
| 2004/0165715 A1 * | 8/2004 | Scott et al. | 379/265.02 |
| 2004/0240439 A1 * | 12/2004 | Castleberry et al. | 370/389 |
| 2005/0053206 A1 * | 3/2005 | Chingon et al. | 379/88.19 |
| 2005/0084087 A1 * | 4/2005 | Rajagopalan et al. | 379/205.01 |
| 2005/0135579 A1 * | 6/2005 | Creamer et al. | 379/127.01 |
| 2005/0286492 A1 * | 12/2005 | Perlmutter et al. | 370/352 |
| 2006/0072726 A1 * | 4/2006 | Klein et al. | 379/201.01 |
| 2007/0041558 A1 * | 2/2007 | Parayil et al. | 379/219 |
| 2008/0056466 A1 * | 3/2008 | Nishimura | 379/88.22 |
| 2009/0041223 A1 * | 2/2009 | Agarwal et al. | 379/211.02 |
| 2009/0141883 A1 * | 6/2009 | Bastien | 379/213.01 |
| 2009/0185554 A1 * | 7/2009 | Provenzale et al. | 370/352 |
| 2009/0293066 A1 * | 11/2009 | Low | 719/316 |
| 2010/0056114 A1 * | 3/2010 | Roundtree et al. | 455/414.1 |
| 2010/0166166 A1 * | 7/2010 | Smith et al. | 379/201.02 |
| 2010/0316195 A1 * | 12/2010 | Di Serio et al. | 379/32.01 |

FOREIGN PATENT DOCUMENTS

JP 2005311889 A * 11/2005

* cited by examiner

*Primary Examiner* — Asad Nawaz
*Assistant Examiner* — Parth Patel

(57) ABSTRACT

A device receives, from a calling party, a call to a Voice over Internet Protocol (VoIP) subscriber, and generates a request for the calling party to record information. The device also receives information from the calling party based on the request, and provides the information from the calling party and call handling options to the VoIP subscriber. The device further receives a response from the VoIP subscriber to the call handling options, and handles the call based on the VoIP subscriber response.

21 Claims, 11 Drawing Sheets

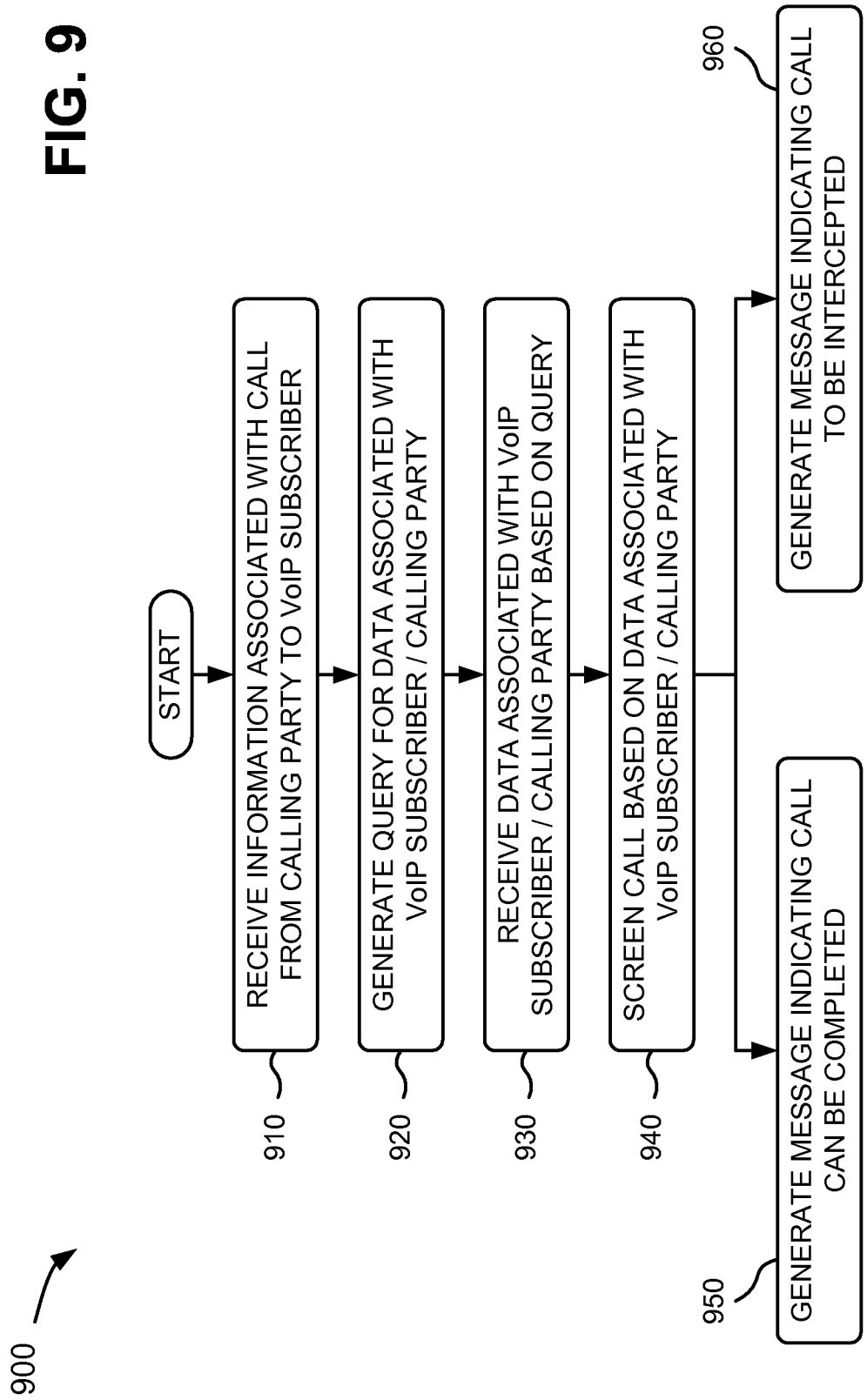

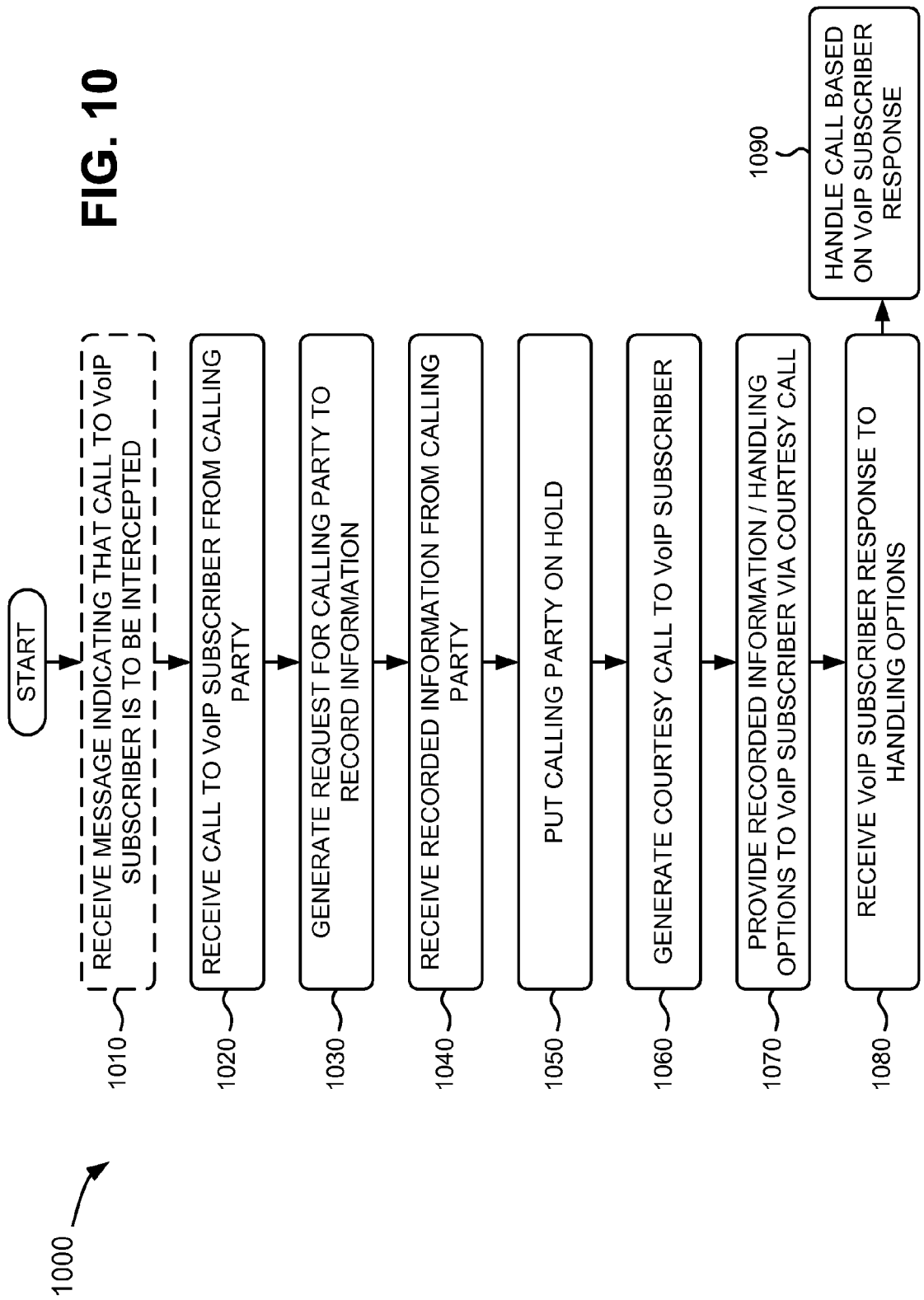

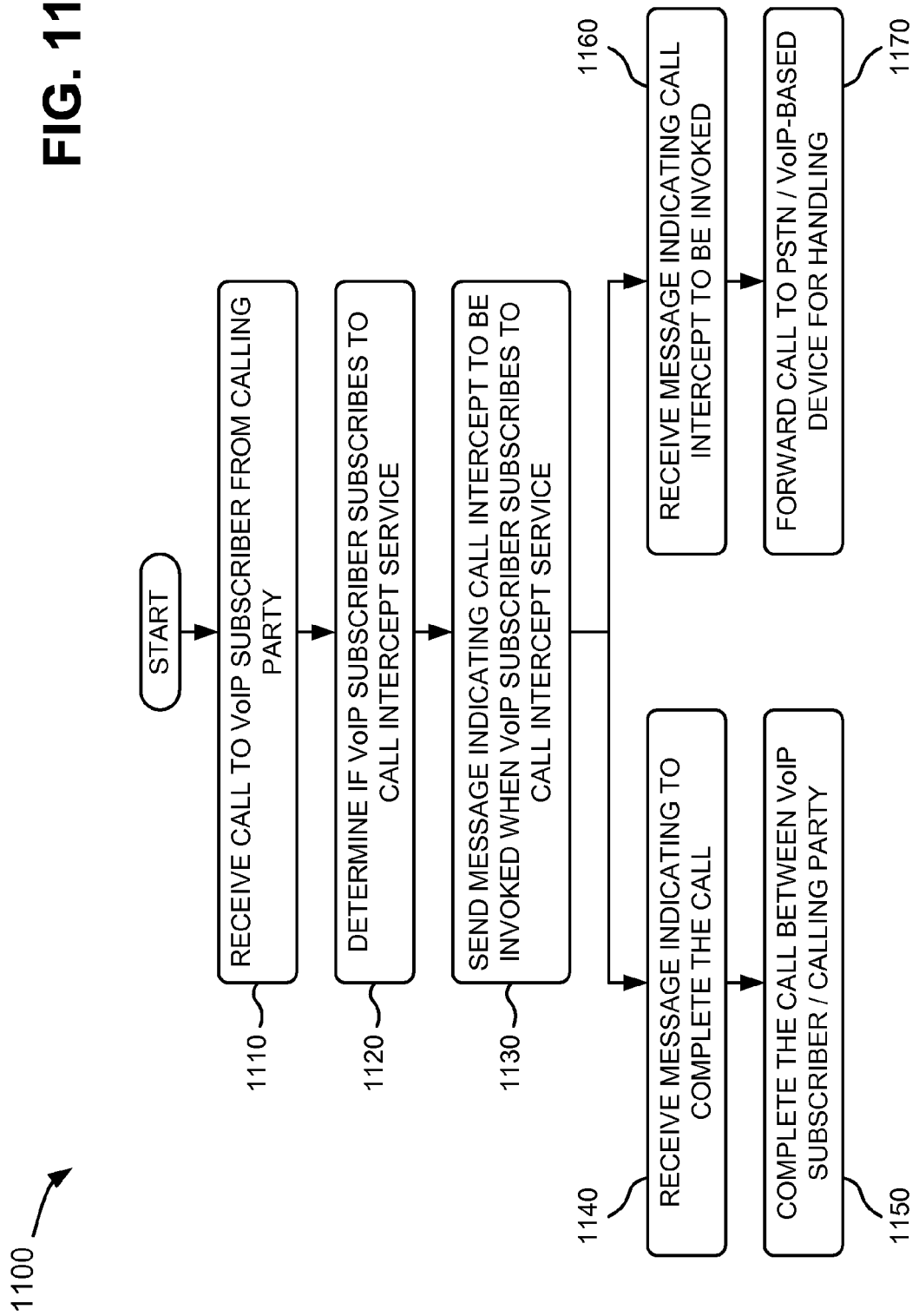

CALL INTERCEPT FOR VOICE OVER INTERNET PROTOCOL (VOIP)

BACKGROUND

Various attempts have been made to shield a telephone subscriber's number from unwanted calls (e.g., telemarketer calls). Having an unlisted telephone number provides some protection from unsolicited calls from the public at large. However, unlisted numbers provide little protection from telemarketers because computer controlled sequential dialing of multiple numbers is commonly performed by telemarketers with the express intent of reaching both listed and unlisted telephone service subscribers.

Some telecommunications systems (e.g., the public switched telephone network (PSTN)) use Signaling System 7 (SS7) standards for communication of telephone calls. SS7 is a digital communications protocol that supports various messaging and call information features that facilitate a variety of telephone services. SS7 facilitates advanced intelligent network (AIN) call processing, such as call handling instructions obtained by a switch from a service control point (SCP). The SCP may include logic (e.g., call processing records) used to provide a switch with specific call processing instructions based on information obtained from a database and/or call information provided by the switch or another source.

Some telecommunications systems use Voice over Internet Protocol (VoIP) based networks for communication of telephone calls. VoIP is a set of facilities used to manage the delivery of voice information over a data network, such as the Internet. VoIP involves sending voice information in digital form in discrete packets rather than by using traditional circuit-committed protocols of the PSTN.

As telecommunications companies begin to deploy large-scale VoIP networks, they are looking for voice applications that will differentiate them from other VoIP service providers. For example, VoIP service providers have been attempting to recreate some existing PSTN-based features on their VoIP-based products. However, some enhanced PSTN-based features remain unavailable in VoIP networks. Call intercept (or call screening) is one feature currently unavailable in VoIP networks. PSTN-based call intercept is built on the AIN platform, and allows a subscriber to screen incoming calls from unknown parties and to redirect the call without ever talking to a calling party.

BRIEF DESCRIPTION OF THE DRAWINGS

FIGS. 9-11 depict flow charts of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide an AIN-based call intercept service to a VoIP subscriber. For example, in one implementation, a PSTN-based device (e.g., a programmable SCP) may receive information associated with a call destined for a VoIP subscriber, and may generate a query for data associated with the VoIP subscriber. The PSTN-based device may receive data associated with the VoIP subscriber based on the query, and may screen the call (e.g., may generate message indicating that the call is to be completed or that the call is to be intercepted) based on the data associated with the VoIP subscriber. In another implementation, a device (e.g., a PSTN-based device or a VoIP-based device) may receive a call destined for a VoIP subscriber from a calling party, and may generate request for the calling party to record or submit information. The device may receive the recorded or submitted information from the calling party, may put the calling party on hold, and may generate a courtesy call to the VoIP subscriber. The device may provide the recorded information and/or handling options to the VoIP subscriber via the courtesy call, may receive a VoIP subscriber response to the handling options, and may handle the call based on the VoIP subscriber response.

Implementations described herein may minimize development time and cost for providing a call intercept service to VoIP subscribers by leveraging existing infrastructure. In one example, the implementations described herein may leverage more of an existing AIN (e.g., a PSTN-based) infrastructure to permit cheaper and faster deployment of the call intercept service. In another example, the implementations described herein may leverage more VoIP signaling and infrastructure, while leveraging some of the existing AIN infrastructure, to provide the call intercept service to VoIP subscribers.

As used herein, the terms "caller," "calling party," and/or "user" may be used interchangeably. Also, the terms "caller," "calling party," and/or "user" are intended to be broadly interpreted to include a calling device or a user of a calling device.

Figure 1:
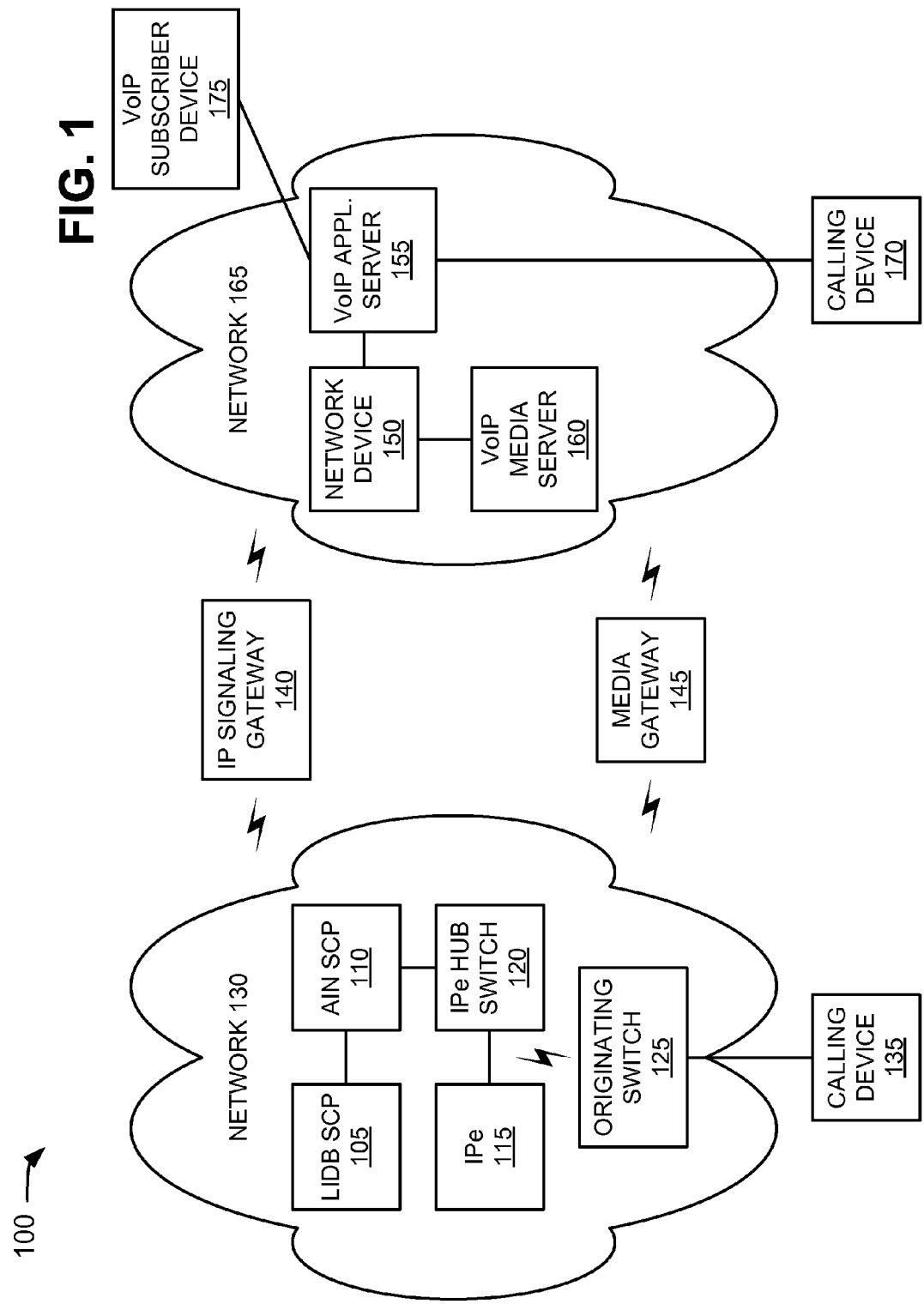
FIG. 1 is a diagram of an exemplary network in which systems and methods described herein may be implemented.

FIG. 1 is a diagram of an exemplary network 100 in which systems and methods described herein may be implemented. As illustrated, network 100 may include a line information database (LIDB) service control point (SCP) 105, an Advanced Intelligent Network (AIN) SCP 110, an intelligent peripheral (IPe) 115, an IPe hub switch 120, and/or an originating switch 125 interconnected by a network 130; a calling device 135; an Internet Protocol (IP) signaling gateway 140; a media gateway 145; a network device 150, a VoIP application server 155, and a VoIP media server 160 interconnected by a network 165; a calling device 170; and/or a VoIP subscriber device 175. LIDB SCP 105, AIN SCP 110, IPe 115, IPe hub switch 120, originating switch 125, calling device 135, IP signaling gateway 140, media gateway 145, network device 150, VoIP application server 155, VoIP media server 160, calling device 170, and/or VoIP subscriber device 175 may connect to network 130 and/or network 165 via wired and/or wireless connections.

A single LIDB SCP 105, AIN SCP 110, IPe 115, IPe hub switch 120, originating switch 125, IP signaling gateway 140, media gateway 145, network device 150, VoIP application server 155, VoIP media server 160, and VoIP subscriber device 175; and two calling devices 135/170 and networks 130/165 have been illustrated in FIG. 1 for simplicity. In practice, there may be more or less LIDB SCPs 105, AIN SCPs 110, IPes 115, IPe hub switches 120, originating switches 120, IP signaling gateways 140, media gateways 145, network devices 150, VoIP application servers 155, VoIP media servers 160, VoIP subscriber devices 175, calling devices 135/170, and/or networks 130/165. Also, in some instances, one or more of LIDB SCP 105, AIN SCP 110, IPe 115, IPe hub switch 120, originating switch 125, calling device 135, IP signaling gateway 140, media gateway 145, network device 150, VoIP application server 155, VoIP media server 160, calling device 170, and/or VoIP subscriber device 175 may perform one or more functions described as being performed by another one or more of LIDB SCP 105, AIN SCP 110, IPe 115, IPe hub switch 120, originating switch 125, calling device 135, IP signaling gateway 140, media gateway 145, network device 150, VoIP application server 155, VoIP media server 160, calling device 170, and/or VoIP subscriber device 175.

LIDB SCP 105 may include one or more server entities, or other types of computation or communication devices, that gather, process, search, and/or provide information in a manner described herein. In one implementation, LIDB SCP 105 may include a server (e.g., a computer system or an application) capable of providing a line information database (e.g., a database maintained by a local telephone company that contains subscriber information, such as service profiles, names, addresses, telephone numbers, etc.).

AIN SCP 110 may include one or more server entities, or other types of computation or communication devices, that gather, process, search, and/or provide information in a manner described herein. In one implementation, AIN SCP 110 may include a device (e.g., a computer system or an application) capable of controlling AIN-based services (e.g., a call intercept service). For example, AIN SCP 110 may receive information associated with a call destined for a VoIP subscriber, and may query its own database for service data associated with the VoIP subscriber. The AIN SCP 110 may also generate a query for data associated with the caller. AIN SCP 110 may receive data associated with the caller based on the query (e.g., from LIDB SCP 105), and may screen the call (e.g., may generate a message indicating that the call is to be completed or that the call is to be intercepted) based on the data associated with the VoIP subscriber and/or the caller. Further details of AIN SCP 110 are provided below in connection with, for example, FIGS. 3, 4, and 8.

IPe 115 may include one or more server entities, or other types of computation or communication devices, that gather, process, search, and/or provide information in a manner described herein. In one implementation, IPe 115 may include a device (e.g., a computer system or an application) capable of delivering additional resources into a call (e.g., related to voice data, such as playing voice announcements or collecting dual tone multi-frequency (DTMF) tones from a caller). For example, IPe 115 may receive a call destined for a VoIP subscriber from a calling party, and may generate a request for the calling party to record or submit information. IPe 115 may receive the recorded or submitted information from the calling party, may put the calling party on hold, and may generate a courtesy call to the VoIP subscriber. IPe 115 may provide the recorded information and/or handling options to the VoIP subscriber via the courtesy call, may receive a VoIP subscriber response to the handling options, and may handle the call based on the VoIP subscriber response. Further details of IPe 115 are provided below in connection with, for example, FIGS. 3 and 5.

IPe hub switch 120 may include a data transfer device, such as a switch or a hub, links provided between any of the aforementioned devices, or some other type of device that processes and/or transfers data. In one implementation, IPe hub switch 120 may be capable of establishing an end-to-end path between AIN SCP 110 and IPe 115.

Originating device 125 may include a data transfer device, such as a switch, or some other type of device that processes and/or transfers data. In one implementation, originating device 125 may be capable of establishing an end-to-end path between calling device 135 and one or more components of network 130 and/or one or more components of network 165 (e.g., via media gateway 145).

Network 130 may include a Public Land Mobile Network (PLMN), a telephone network, such as the Public Switched Telephone Network (PSTN) or a cellular telephone network (e.g., wireless GSM, wireless CDMA, etc.), or a combination of networks.

Calling device 135 may include a Plain Old Telephone Service (POTS) telephone, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), or other types of computation or communication devices, threads or processes running on these devices, and/or objects executable by these devices. In one implementation, calling device 135 may include a PSTN-based calling device that is capable of initiating a call to a VoIP subscriber (e.g., via VoIP subscriber device 175).

IP signaling gateway 140 may include a device that may provide bi-directional translation between PSTN telephony signaling (e.g., such as SS7) messages and IP telephony signaling messages (e.g., in protocols such as International Telecommunication Union (ITU) H.323, Session Initiation Protocol (SIP), etc.). In one implementation, IP signaling gateway 140 may transfer signaling messages (i.e., information related to call establishment, billing, location, short messages, address conversion, etc.) between nodes that communicate using different protocols and transports. For example, IP signaling gateway 140 may translate data exchanged between components of network 130 and components of network 165.

Media gateway 145 may include a device that may provide translations of data provided between disparate telecommunications networks (e.g., between a PSTN network and a VoIP network). In one implementation, media gateway 145 may provide bi-directional conversion between time division multiplexed (TDM) signals and IP transport packets in a certain protocol (e.g., a real-time transport protocol (RTP)). For example, media gateway 145 may translate data exchanged between components of network 130 and components of network 165.

Network device 150 may include a data transfer device, such as a gateway, a router, a switch, a firewall, a network interface card (NIC), a hub, a bridge, a proxy server, an optical add-drop multiplexer (OADM), a line access multiplexer (LAM), a permanent or private virtual circuit (PVC), links provided between any of the aforementioned devices, or some other type of device that processes and/or transfers data. In one implementation, network device 150 may be capable of establishing an end-to-end path between components of network 165.

VoIP application server 155 may include one or more server entities, or other types of computation or communication devices, that gather, process, search, and/or provide information in a manner described herein. In one implementation, VoIP application server 155 may include a device (e.g., a computer system or an application) capable of providing VoIP-based applications to one or more VoIP subscribers. For example, VoIP application server 155 may receive a call destined for a VoIP subscriber from a calling party (e.g., via calling device 135), may determine whether the VoIP subscriber subscribes to a call intercept service, and may send a message indicating that call intercept is to be invoked when the VoIP subscriber subscribes to the call intercept service. VoIP application server 155 may receive a message indicating to complete the call (and may complete the call between the VoIP subscriber and the calling party), or may receive a message indicated that call intercept is to be invoked (and may forward the call to a PSTN and/or VoIP-based device for handling). Further details of VoIP application server 155 are provided below in connection with, for example, FIGS. 3, 6, and 7.

VoIP media server 160 may include one or more server entities, or other types of computation or communication devices, that gather, process, search, and/or provide information in a manner described herein. In one implementation, VoIP media server 160 may include a device (e.g., a computer system or an application) capable of processing and generating media streams. VoIP media server 160 may handle functions, such as decoding DTMF tones, bridging multiple media streams into a conference, playing announcements (e.g., "This number is not in service"), processing Voice Extensible Markup Language (XML) scripts, speech recognition, text to speech conversion, recording audio, etc. In one implementation, VoIP media server 160 may be controlled using SIP messages. In one example, VoIP media server 160 may receive a message indicating that a call destined for a VoIP subscriber is to be intercepted, may receive the call from a calling party, and may generate a request for the calling party to record information from the calling party. VoIP media server 160 may receive the recorded information from the calling party, may put the calling party on hold, and may generate a courtesy call to the VoIP subscriber. VoIP media server 160 may provide the recorded information and/or handling options to the VoIP subscriber via the courtesy call, may receive a VoIP subscriber response to the handling options, and may handle the call based on the VoIP subscriber response. Further details of VoIP media server 160 are provided below in connection with, for example, FIGS. 7 and 8.

Network 165 may include a local area network (LAN), a wide area network (WAN), a metropolitan area network (MAN), an intranet, the Internet, an IP-based network, a VoIP-based network, or a combination of networks.

Calling device 170 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, a VoIP-based device, or other types of computation or communication devices, threads or processes running on these devices, and/or objects executable by these devices. In one implementation, calling device 170 may include a VoIP-based calling device that is capable of initiating and/or receiving a call to/from a VoIP subscriber (e.g., via VoIP subscriber device 175).

VoIP subscriber device 175 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, a VoIP-based device, or other types of computation or communication devices, threads or processes running on these devices, and/or objects executable by these devices. In one implementation, VoIP subscriber device 175 may include a VoIP-based device that may be a subscriber of a VoIP-based network (e.g., network 165).

Network 100 may utilize a variety of methods to permit AIN queries using IP protocols (e.g., to provide the call intercept service for VoIP subscribers). In one implementation, for example, network 100 may use a SIP transport protocol to provide the call intercept service to VoIP subscribers. The SIP protocol may carry user-defined payloads, which may be used to send information that is used to make service decisions and to respond with routing locations. In other implementations, network 100 may provide similar functions using XML data structures transported using, for example, a Hypertext Transfer Protocol (HTTP).

In one implementation, the call intercept service logic described herein may be provided in AIN SCP 110 and IPe 115. IPe 115 may be subservient to AIN SCP 110 in that AIN SCP 110 may decide when IPe 115 functions may be needed for the call intercept service. VoIP subscriber information that may be needed for the call intercept service may be provided in AIN SCP 110. Call intercept service logic and/or subscriber information may be provided in AIN SCP 110 so that it may be accessed by calling devices connected to a PSTN network (e.g., network 130) and/or by calling devices connected to a VoIP network (e.g., network 165). In other implementations, the call intercept service logic described herein may be provided in devices (e.g., in VoIP media server 160) that include or do not include AIN SCP 110 and IPe 115.

Figure 2:
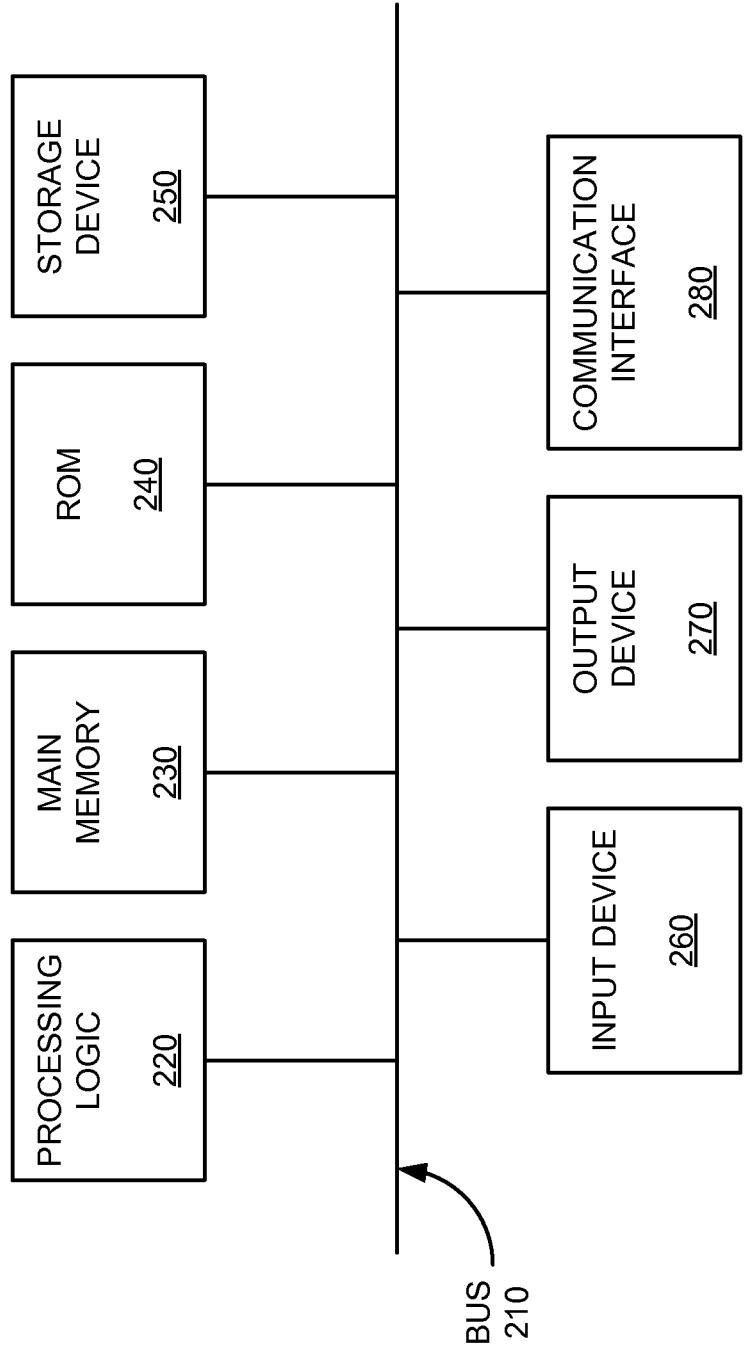
FIG. 2 illustrates exemplary components of a line information database (LIDB) SCP, an AIN SCP, an intelligent peripheral (IPe), an IPe hub switch, an originating switch, calling devices, an IP signaling gateway, a media gateway, a network device, a VoIP application server, a VoIP media server, and/or a VoIP subscriber device of the network depicted in FIG. 1.

FIG. 2 is an exemplary diagram of a device 200 that may correspond to any of LIDB SCP 105, AIN SCP 110, IPe 115, IPe hub switch 120, originating switch 125, calling device 135, IP signaling gateway 140, media gateway 145, network device 150, VoIP application server 155, VoIP media server 160, calling device 170, and/or VoIP subscriber device 175. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 130 and/or network 165.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
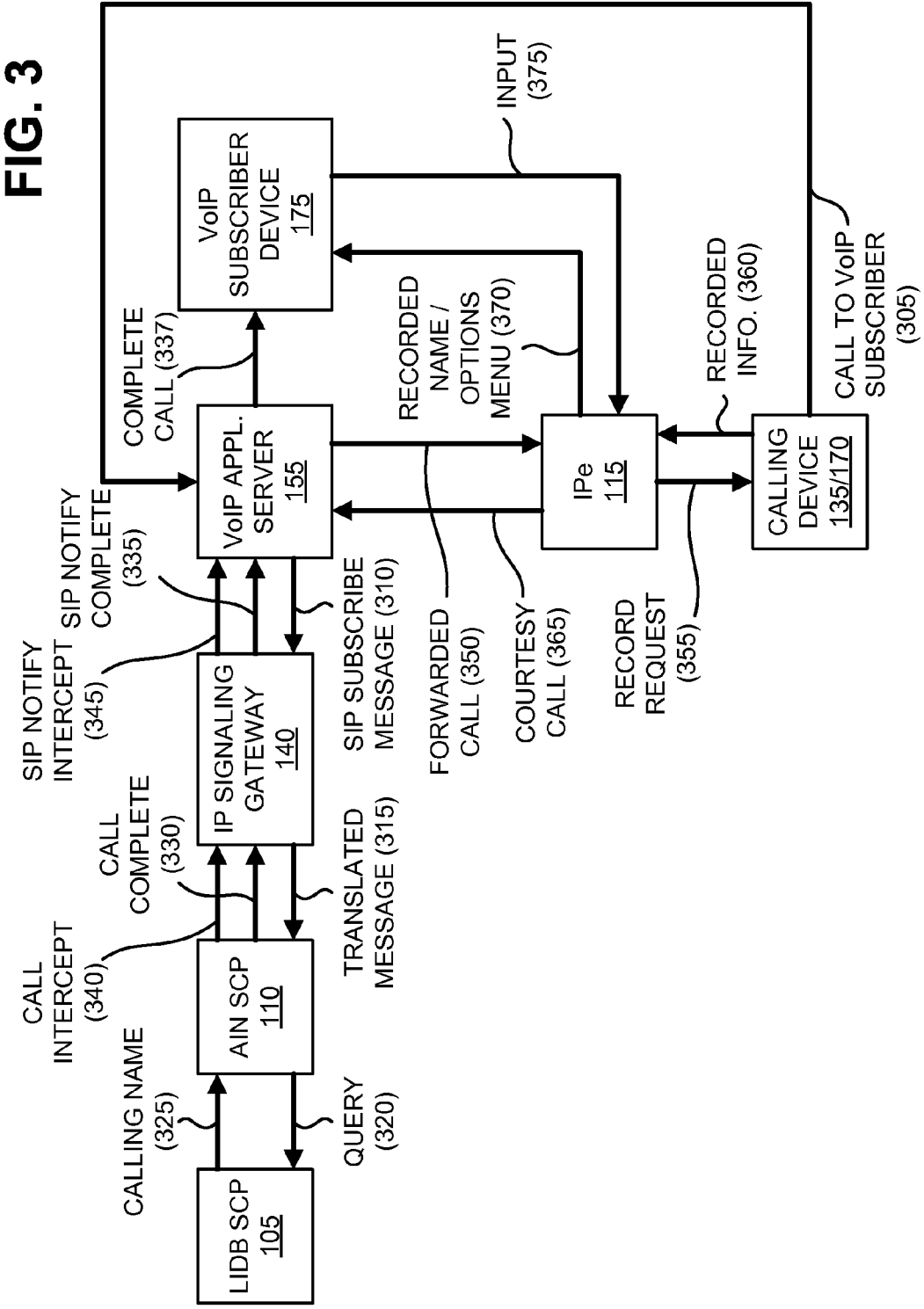
FIG. 3 depicts a diagram of a portion of the network illustrated in FIG. 1, and exemplary interactions between the network components for providing a call intercept service to a VoIP subscriber, according to an implementation described herein.

FIG. 3 depicts a diagram of a portion 300 of network 100, and exemplary interactions between the network components for providing a call intercept service to a VoIP subscriber, according to an implementation described herein. As illustrated, network portion 300 may include LIDB SCP 105, AIN SCP 110, IPe 115, calling device 135, IP signaling gateway 140, VoIP application server 155, calling device 170, and/or VoIP subscriber device 175, as described above in connection with FIG. 1.

As further shown in FIG. 3, if a calling party places a call 305 (e.g., via calling device 135 and/or calling device 170) to a VoIP subscriber (e.g., connected to VoIP subscriber device 175), VoIP application server 155 may receive call 305. Prior to allowing call 305 to connect to VoIP subscriber device 175, VoIP application server 155 may analyze the VoIP subscriber's services and may determine whether the VoIP subscriber subscribes to the call intercept service. If the VoIP subscriber subscribes to the call intercept service, VoIP application server 155 may send a SIP SUBSCRIBE message 310 to IP signaling gateway 140. SIP SUBSCRIBE message 310 may include information (e.g., an event package) that indicates that the call intercept service should be invoked by AIN SCP 110, information about call 305 that may be needed to execute the call intercept service (e.g., information, such as a calling party identification, a VoIP subscriber identification, a presentation indication, etc.), etc.

IP signaling gateway 140 may receive SIP SUBSCRIBE message 310 from VoIP application server 155, and may translate SIP SUBSCRIBE message 310 into a protocol that may be understood by AIN SCP 110. Based on the translation, IP signaling gateway 140 may generate and provide a translated message 315 to AIN SCP 110. Translated message 315 may include information that indicates that the call intercept service should be invoked by AIN SCP 110, information about call 305 that may be needed to execute the call intercept service (e.g., information, such as a calling party identification, a VoIP subscriber identification, a presentation indication, etc.), etc.

AIN SCP 110 may receive translated message 315 from IP signaling gateway 140, and may generate a query 320 for data associated with the caller based on translated message 315. AIP SCP 110 may provide query 320 to LIDB SCP 105, and LIDB SCP 105 may return data associated with the caller (e.g., a calling name 325 of the calling party) based on query 320. AIN SCP 110 may screen call 305 based on the data associated with the VoIP subscriber and/or the caller, and may determine that call 305 can be completed to the VoIP subscriber or that call 305 should be intercepted.

If call 305 is to be completed, AIN SCP 110 may provide a message 330 to IP signaling gateway 140, indicating that call 305 is to be completed. IP signaling gateway 140 may receive message 330, and may provide a SIP NOTIFY message 335 to VoIP application server 155. SIP NOTIFY message 335 may include information indicating a disposition of call 305 (e.g., that call 305 is to be completed). VoIP application server 155 may receive SIP NOTIFY message 335, and may permit call 305 to be completed to the VoIP subscriber, as shown by reference number 337, based on SIP NOTIFY message 335.

If call 305 is to be intercepted, AIN SCP 110 may provide a message 340, indicating that call 305 is to be intercepted, to IP signaling gateway 140. IP signaling gateway 140 may receive message 340, and may provide a SIP NOTIFY message 345 to VoIP application server 155. SIP NOTIFY message 345 may include information indicating a disposition of call 305 (e.g., that call 305 is to be intercepted). VoIP application server 155 may receive SIP NOTIFY message 345, and may forward call 305 to IPe 115, as shown by reference number 350, based on SIP NOTIFY message 345.

If call 305 is routed to IPe 115, IPe 115 may provide a request 355 to record information (e.g., a name) associated with the calling party. The calling party may record the requested information (e.g., via calling device 135/170), and may provide recorded information 360 (e.g., a recorded name) to IPe 115. If the calling party successfully provides recorded information 360 to IPe 115, IPe 115 may put the calling part on hold, and may provide a courtesy call 365 to the VoIP subscriber, via VoIP application server 155. Courtesy call 365 may appear like other incoming calls to VoIP application server 155. Accordingly, VoIP application server 155 may again determine that the VoIP subscriber subscribes to the call intercept service, and may provide a SIP SUBSCRIBE message (e.g., similar to SIP SUBSCRIBE message 310) to IP signaling gateway 140. A message flow similar to the message flow described above for call 305 may deliver courtesy call 365 to AIN SCP 110. AIN SCP 110 may identify courtesy call 365 as a courtesy call by determining that a calling party identification belongs to IPe 115. AIN SCP 110 may provide a message, indicating that courtesy call 365 may be completed to the VoIP subscriber, to VoIP application server 155 (e.g., via IP signaling gateway 140).

If VoIP application server 155 completes courtesy call 365 to the VoIP subscriber, IPe 115 may provide recorded information 360 and/or a menu of options for handling call 305 (e.g., connect call 305, decline call 305, route call 305 to voicemail, etc.), as indicated by reference number 370. The VoIP subscriber (e.g., via VoIP subscriber device 175) may provide input 375 (e.g., a DTMF input) responsive to the menu of options to IPe 115, and IPe 115 may handle call 305 based on input 375.

As described above, the call intercept service may be provided or supported by devices provided in an existing PSTN network (e.g., network 130). VoIP application server 155 may be modified to identify that a VoIP subscriber subscribes to a call intercept service, and to send an appropriate SIP SUBSCRIBE message (e.g., SIP SUBSCRIBE message 310). In one exemplary implementation, the SIP SUBSCRIBE message may include the following format:

```
SUBSCRIBE sip:ospg01.ci.sip2ss7.foobar.com SIP/2.0
Via:SIP/2.0/UDP 192.111.22.333;branch=z9hG4bK-AppServer.as1n-
172.25.111.22V5060-0-974342056-2109285500-1187359657806-;
event=CallIntercept
From:<sip:as1n.foobar.com>;tag=2109285500-1187359657806-
To:<sip:ospg01.ci.sip2ss7.foobar.com>
Call-ID:BW100737806170807-1482733508@as1n.foobar.com
CSeq:974342056 SUBSCRIBE
Contact:<sip: 192.111.22.333>
Accept:application/mailbox-info
Expires:0
Event: CallIntercept;id=2
Max-Forwards:20
Content-Type:application/ CallIntercept-info
Content-Length:114
Called-party:sip+12025551234@voip.nw.com;user=phone
Calling-party:sip:+13016501224@sitn.foobar.com;user=phone
Presentation:Restricted
```

In response to SIP SUBSCRIBE message, VoIP application server 155 may receive the following exemplary SIP NOTIFY message (e.g., SIP NOTIFY message 345):

```
NOTIFY sip: 192.111.22.333 SIP/2.0
Via: SIP/2.0/UDP 0.0.0.0:5060;branch=z9hG4bKIchQs9ShPDHFf.-
RdYH4FZA~~3797822
Max-Forwards: 70
To: <sip:as1n.foobar.com>;tag=2109285500-1187359657806-
From: <sip:ospg01.ci.sip2ss7.foobar.com>;tag=2kp1qtbp2i0w
Call-ID: BW100737806170807-1482733508@as1n.foobar.com
CSeq: 1 NOTIFY
Content-Length: 143
Event: CallIntercept;id=2
Contact: sip:sas@xyzasv01
Subscription-State: terminated
Content-Type: application/CallIntercept-info
Date: Fri, 17 Aug 2007 14:07:38 GMT
Status: Forward-the-Call
RoutingNumber: 2029874321
```

Alternatively and/or additionally, VoIP application server 155 may be modified to recognize a calling number of IPe 115, and to complete courtesy call 365 between IPe 115 and the VoIP subscriber without sending a SIP SUBSCRIBE message a second time.

Although FIG. 3 shows exemplary components of network portion 300, in other implementations, network portion 300 may contain fewer, different, or additional components than depicted in FIG. 3. In still other implementations, one or more components of network portion 300 may perform one or more other tasks described as being performed by one or more other components of network portion 300.

Figure 4:
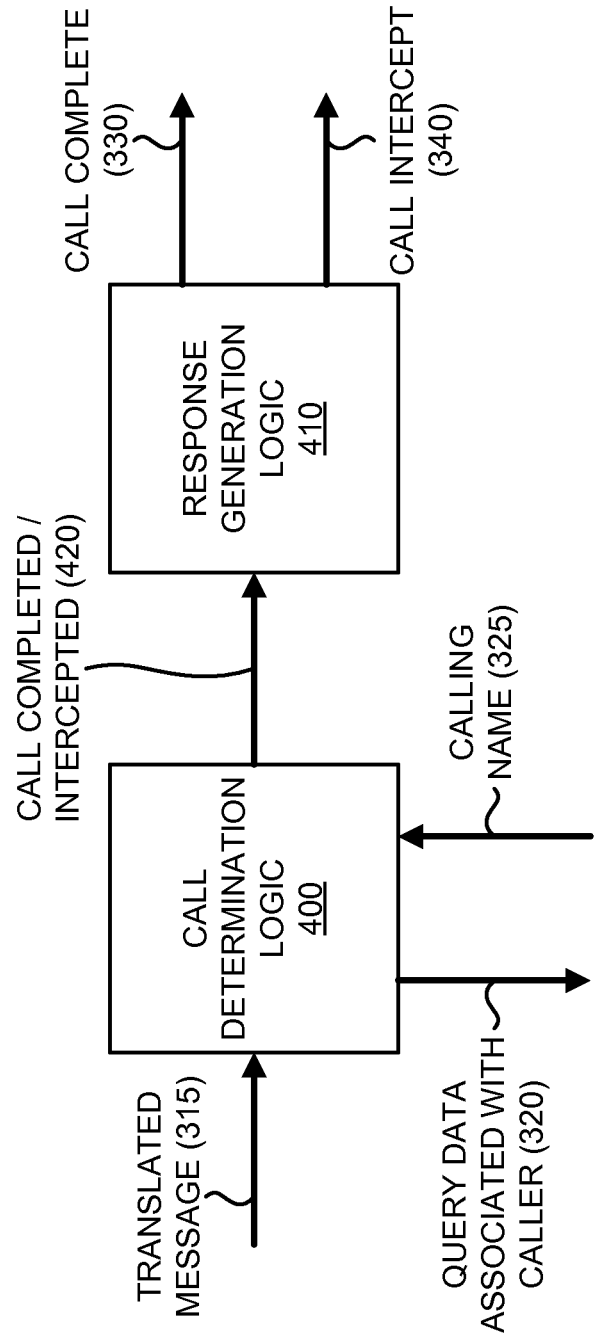
FIG. 4 illustrates a diagram of exemplary functional components of the AIN SCP of the network depicted in FIG. 1.

FIG. 4 illustrates a diagram of exemplary functional components of AIN SCP 110. As illustrated, AIN SCP 110 may include call determination logic 400 and response generation logic 410. The functions described in FIG. 4 may be performed by one or more of the exemplary components of device 200 depicted in FIG. 2.

Call determination logic 400 may include any hardware and/or software based logic (e.g., processing logic 220) that may enable AIN SCP 110 to receive a translated message (e.g., translated message 315) from IP signaling gateway 140, and to generate a query (e.g., query 320) for data associated with the VoIP subscriber and/or the caller based on translated message 315. Call determination logic 400 may provide query 320 to LIDB SCP 105, and LIDB SCP 105 may return data associated with the caller (e.g., calling name 325 of the calling party) based on query 320. Call determination logic 400 may provide an indication 420 of whether a call (e.g., call 305) may be completed or intercepted (e.g., based on calling name 325) to response generation logic 410.

Response generation logic 410 may include any hardware and/or software based logic (e.g., processing logic 220) that may enable response generation logic 410 to receive indication 420 from call determination logic 400, and to generate either a message (e.g., message 330) indicating that a call is to be completed or a message (e.g., message 340) indicating that a call is to be intercepted. Response generation logic 410 may provide message 330 or 340 to IP signaling gateway 140.

Although FIG. 4 shows exemplary functional components of AIN SCP 110, in other implementations, AIN SCP 110 may contain fewer, different, or additional functional components than depicted in FIG. 4. In still other implementations, one or more functional components of AIN SCP 110 may perform one or more other tasks described as being performed by one or more other functional components of AIN SCP 110.

Figure 5:
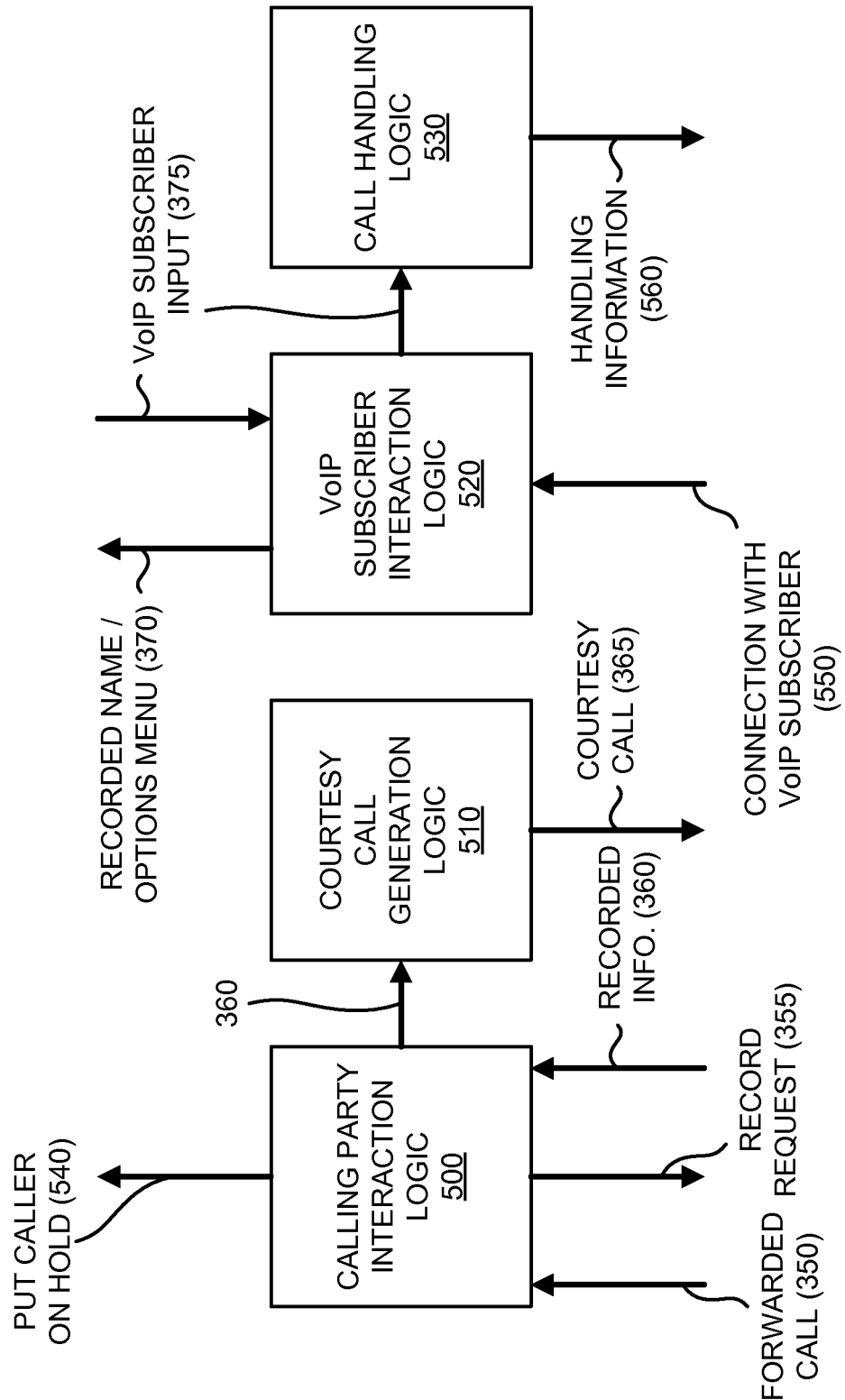
FIG. 5 depicts a diagram of exemplary functional components of the IPe of the network illustrated in FIG. 1.

FIG. 5 illustrates an exemplary functional block diagram of IPe 115. As illustrated, IPe 115 may include calling party interaction logic 500, courtesy call generation logic 510, VoIP subscriber interaction logic 520, and call handling logic 530. The functions described in FIG. 5 may be performed by one or more of the exemplary components of device 200 depicted in FIG. 2.

Calling party interaction logic 500 may include any hardware and/or software based logic (e.g., processing logic 220) that may enable IPe 115 to receive a forwarded call (e.g., forwarded call 350), and to generate a request (e.g., request 355) to record information (e.g., a name) associated with a calling party. The calling party may record the requested information (e.g., via calling device 135/170), and calling party interaction logic 500 may receive recorded information 360 (e.g., a recorded name) from the calling party. If the calling party successfully provides recorded information 360 to IPe 115, calling party interaction logic 500 may put the calling part on hold, as indicated by reference number 540, and may provide recorded information 360 to courtesy call generation logic 510.

Courtesy call generation logic 510 may include any hardware and/or software based logic (e.g., processing logic 220) that may enable courtesy call generation logic 510 to receive recorded information 360 from calling party interaction logic 500, and to provide a courtesy call (e.g., courtesy call 365) to the VoIP subscriber (e.g., via VoIP application server 155).

VoIP subscriber interaction logic 520 may include any hardware and/or software based logic (e.g., processing logic 220) that may enable IPe 115 to receive a connection 550 with the VoIP subscriber if VoIP application server 155 completes courtesy call 365 to the VoIP subscriber. VoIP subscriber interaction logic 520 may provide recorded information and/or a menu of options for handling a call (e.g., connect a call, decline a call, route a call to voicemail, etc.), as indicated by reference number 370. The VoIP subscriber (e.g., via VoIP subscriber device 175) may provide input (e.g., input 375) responsive to the menu of options to VoIP subscriber interaction logic 520, and VoIP subscriber interaction logic 520 may provide input 375 to call handling logic 530.

Call handling logic 530 may include any hardware and/or software based logic (e.g., processing logic 220) that may enable IPe 115 to receive input 375 from VoIP subscriber interaction logic 520, and to handle a call based on input 375. In one implementation, call handling logic 530 may generate handling information 560 (e.g., information providing instructions on how to handle a call, such as connect the call, decline the call, route the call to voicemail, etc.), and may provide handling information 560 to components of network 100 for execution. In other implementations, call handling logic 530 may not output handling information 560, and may handle the call itself based on input 375.

Although FIG. 5 shows exemplary functional components of IPe 115, in other implementations, IPe 115 may contain fewer, different, or additional functional components than depicted in FIG. 5. In still other implementations, one or more functional components of IPe 115 may perform one or more other tasks described as being performed by one or more other functional components of IPe 115.

Figure 6:
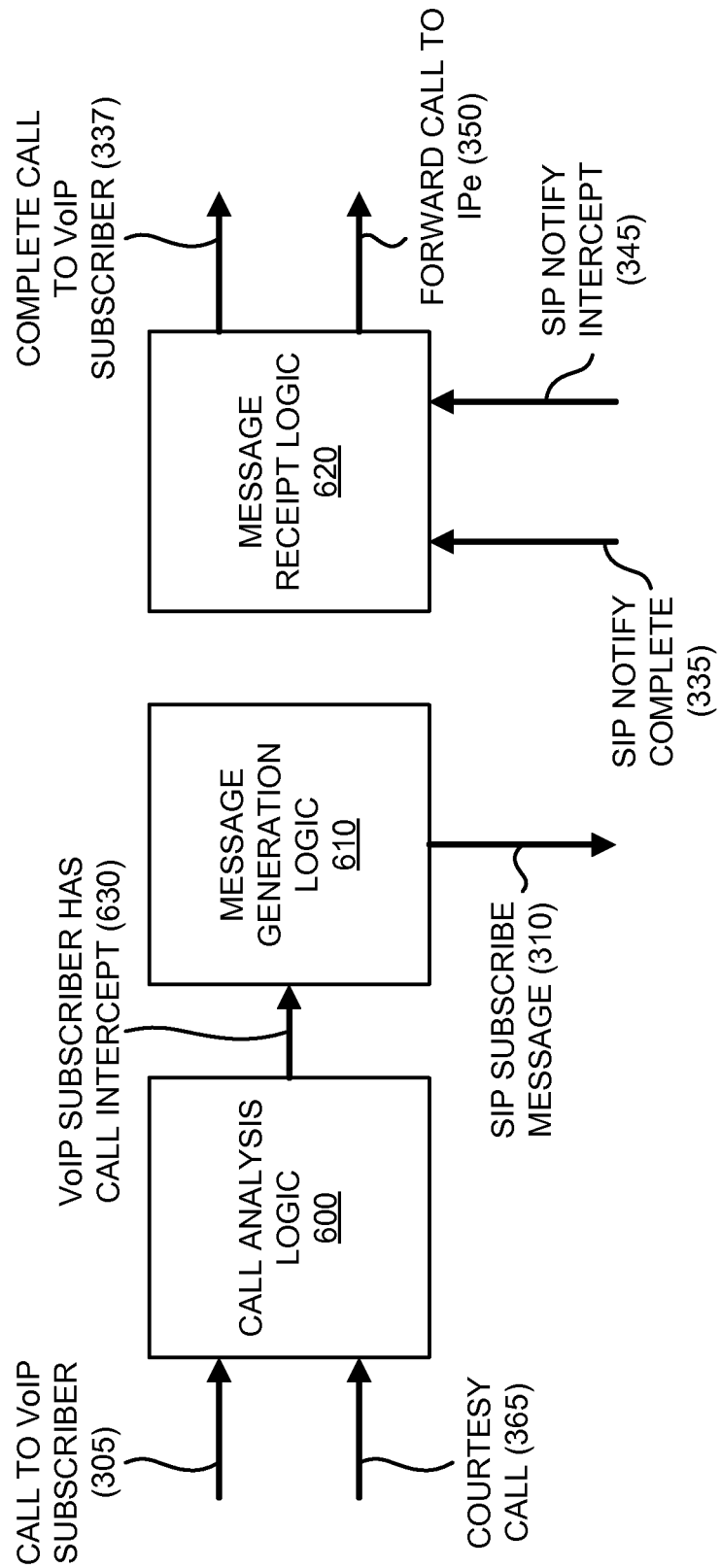
FIG. 6 illustrates a diagram of exemplary functional components of one VoIP application server of the network depicted in FIG. 1.

FIG. 6 illustrates an exemplary functional block diagram of VoIP application server 155. As illustrated, VoIP application server 155 may include call analysis logic 600, message generation logic 610, and message receipt logic 620. The functions described in FIG. 6 may be performed by one or more of the exemplary components of device 200 depicted in FIG. 2.

Call analysis logic 600 may include any hardware and/or software based logic (e.g., processing logic 220) that enables VoIP application server 155 to receive a call (e.g., call 305 or courtesy call 365) to a VoIP subscriber, to analyze the VoIP subscriber's services, and to determine whether the VoIP subscriber subscribes to a call intercept service. If the VoIP subscriber subscribes to the call intercept service, call analysis logic 600 may provide a message 630, indicating that the VoIP subscriber subscribes to the call intercept service, to message generation logic 610. If the VoIP subscriber subscribes to the call intercept service, call analysis logic 600 may generate message 630 regardless of whether the call is from a calling party (e.g., call 305) or from IPe 115 (e.g., call 365).

Message generation logic 610 may include any hardware and/or software based logic (e.g., processing logic 220) that enables VoIP application server 155 to receive message 630 from call analysis logic 600, and to generate a message (e.g., SIP SUBSCRIBE message 310) that includes information indicating that the call intercept service should be invoked (e.g., by AIN SCP 110), information about the call that may be needed by the call intercept service (e.g., information, such as a calling party identification, a VoIP subscriber identification, a presentation indication, etc.), etc. Message generation logic 610 may provide SIP SUBSCRIBE message 310 to IP signaling gateway 140.

Message receipt logic 620 may include any hardware and/or software based logic (e.g., processing logic 220) that enables VoIP application server 155 to receive a message (e.g., SIP NOTIFY message 335 or SIP NOTIFY message 345) from IP signaling gateway 140. SIP NOTIFY message 335 may include information indicating a disposition of the call (e.g., that the call is to be completed). Message receipt logic 620 may receive SIP NOTIFY message 335, and may permit the call (e.g., call 305) to be completed between the calling party and the VoIP subscriber, as indicated by reference number 337. SIP NOTIFY message 345 may include information indicating a disposition of call 305 (e.g., that call is to be intercepted). Message receipt logic 620 may receive SIP NOTIFY message 345, and may forward the call (e.g., call 305) to IPe 115, as indicated by reference number 350.

Although FIG. 6 shows exemplary functional components of VoIP application server 155, in other implementations, VoIP application server 155 may contain fewer, different, or additional functional components than depicted in FIG. 6. In still other implementations, one or more functional components of VoIP application server 155 may perform one or more other tasks described as being performed by one or more other functional components of VoIP application server 155.

Figure 7:
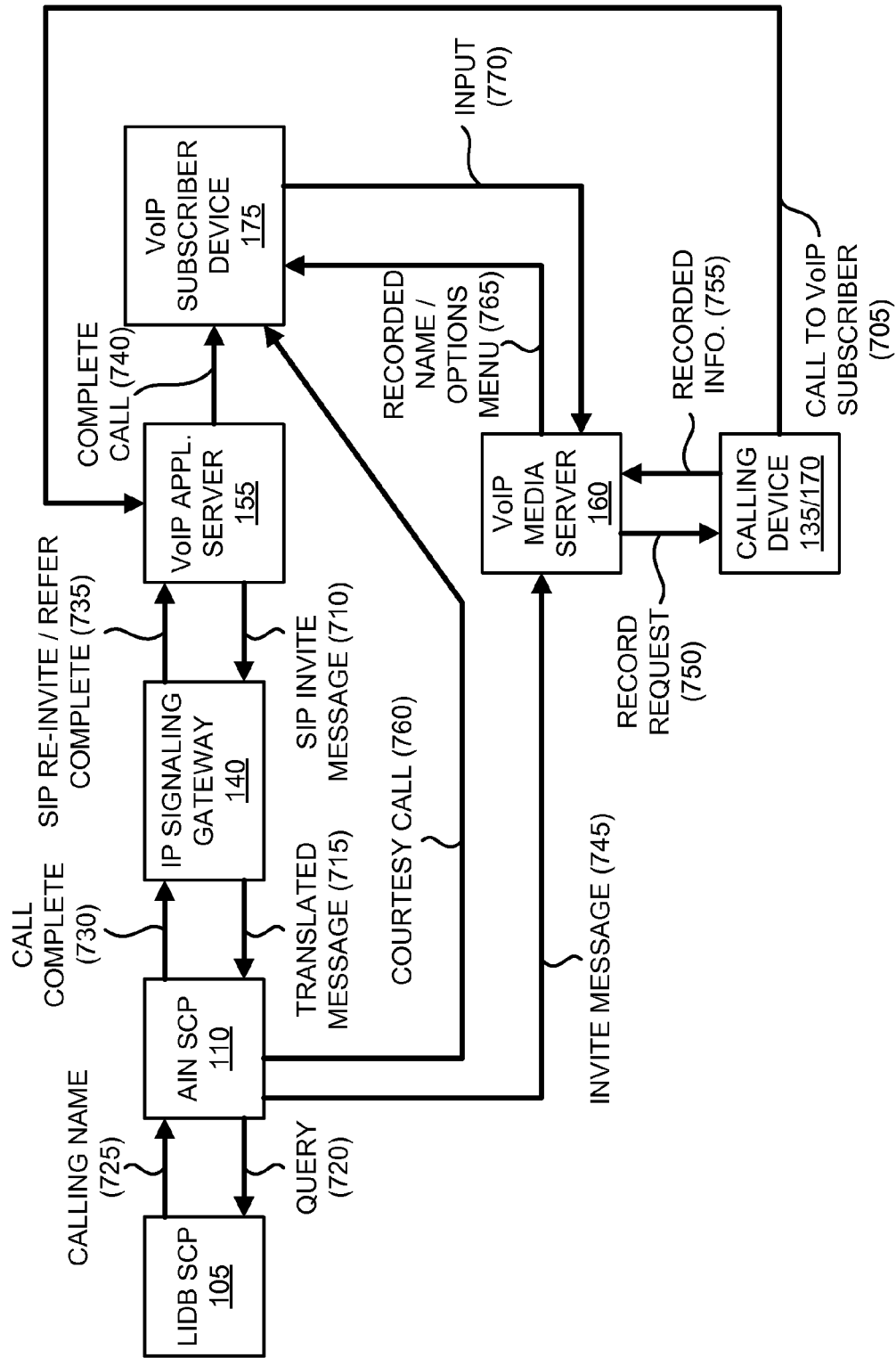
FIG. 7 depicts a diagram of a portion of the network illustrated in FIG. 1, and exemplary interactions between the network components for providing a call intercept service to a VoIP subscriber, according to another implementation described herein.

FIG. 7 depicts a diagram of a portion 700 of network 100, and exemplary interactions between the network components for providing a call intercept service to a VoIP subscriber, according to another implementation described herein. As illustrated, network portion 700 may include LIDB SCP 105, AIN SCP 110, calling device 135, IP signaling gateway 140, VoIP application server 155, VoIP media server 160, calling device 170, and/or VoIP subscriber device 175, as described above in connection with FIG. 1.

As further shown in FIG. 7, if a calling party places a call 705 (e.g., via calling device 135 and/or calling device 170) to a VoIP subscriber (e.g., connected to VoIP subscriber device 175), VoIP application server 155 may receive call 705. Prior to allowing call 705 to connect to VoIP subscriber device 175, VoIP application server 155 may analyze the VoIP subscriber's services and may determine whether the VoIP subscriber subscribes to the call intercept service. If the VoIP subscriber subscribes to the call intercept service, VoIP application server 155 may send a SIP INVITE message 710 to IP signaling gateway 140. SIP INVITE message 710 may include information (e.g., a uniform resource locator (URL) address) that indicates that the call intercept service should be invoked by AIN SCP 110, a header or a parameter indicating that the call intercept service should be invoked by AIN SCP 110, etc.

IP signaling gateway 140 may receive SIP INVITE message 710 from VoIP application server 155, and may translate SIP INVITE message 710 into a protocol that may be understood by AIN SCP 110. Based on the translation, IP signaling gateway 140 may generate and provide a translated message 715 to AIN SCP 110. Translated message 715 may include information that indicates that the call intercept service should be invoked by AIN SCP 110, information about call 705 that may be needed by the call intercept service (e.g., information, such as a calling party identification, a VoIP subscriber identification, a presentation indication, etc.), etc.

AIN SCP 110 may receive translated message 715 from IP signaling gateway 140, and may generate a query 720 for data associated with the caller based on translated message 715. AIP SCP 110 may provide query 720 to LIDB SCP 105, and LIDB SCP 105 may return data associated with the caller (e.g., a calling name 725 of the calling party) based on query 720. AIN SCP 110 may screen call 705 based on the data associated with the VoIP subscriber and/or the caller, and may determine that call 705 can be completed to the VoIP subscriber or that call 305 should be intercepted.

If call 705 is to be completed, AIN SCP 110 may provide a message 730, indicating that call 305 is to be completed, to IP signaling gateway 140. IP signaling gateway 140 may receive message 730, and may provide a SIP re-INVITE or REFER message 735 to VoIP application server 155. SIP re-INVITE/REFER message 735 may include information indicating a disposition of call 705 (e.g., that call 705 is to be completed). VoIP application server 155 may receive SIP re-INVITE/REFER message 735, and may permit call 705 to be completed to the VoIP subscriber, as indicated by reference number 740, based on SIP re-INVITE/REFER message 735.

If call 705 is to be intercepted, AIN SCP 110 may provide a message 745, indicating that call 705 is to be intercepted, to VoIP media server 160 (e.g., via IP signaling gateway 140). Message 745 may invite VoIP media server 160 to connect to call 705. Message 745 may include information indicating a disposition of call 705 (e.g., that call is to be intercepted).

VoIP media server 160 may receive message 745, and may connect to call 705 based on message 745.

If call 705 is connected to VoIP media server 160, VoIP media server 160 may provide a request 750 to record information (e.g., a name) associated with the calling party. The calling party may record the requested information (e.g., via calling device 135/170), and may provide recorded information 755 (e.g., a recorded name) to VoIP media server 160. If the calling party successfully provides recorded information 755 to VoIP media server 160, AIN SCP 110 may put the calling part on hold, and may provide a courtesy call 760 to the VoIP subscriber (e.g., via IP signaling gateway 140, VoIP application server 155, and VoIP subscriber device 175). Courtesy call 760 may appear like other incoming calls to VoIP application server 155. Accordingly, VoIP application server 155 may again determine that the VoIP subscriber subscribes to the call intercept service. AIN SCP 110 may provide a message, indicating that courtesy call 760 may be completed to the VoIP subscriber, to VoIP application server 155 (e.g., via IP signaling gateway 140).

If VoIP application server 155 completes courtesy call 760 to the VoIP subscriber, VoIP media server 160 may provide recorded information 755 and/or a menu of options for handling call 705 (e.g., connect call 705, decline call 705, route call 705 to voicemail, etc.), as indicated by reference number 765. The VoIP subscriber (e.g., via VoIP subscriber device 175) may provide input 770 (e.g., a DTMF input or using voice recognition) responsive to the menu of options to VoIP media server 160, and AIN SCP 110 may handle call 705 based on input 770 (e.g., may complete call 705 using message 730, may send the caller to voice mail, may terminate call 705 without an announcement, etc.).

The interactions described above in connection with network portion 700 may enable a call (e.g., call 705) to a VoIP subscriber to remain within a VoIP network (e.g., network 165) without having to duplicate a call intercept service in VoIP application server 155. Furthermore, AIN SCP 110 may include the SIP functionality described above, as well as core service logic (e.g., screening rules, etc.), to provide the call intercept service to both PSTN-based subscribers and VoIP-based subscribers. This may reduce costs of developing the call intercept service a second time and may ensure that the call intercept service is consistent for PSTN and VoIP environments.

Although FIG. 7 shows exemplary components of network portion 700, in other implementations, network portion 700 may contain fewer, different, or additional components than depicted in FIG. 7. In still other implementations, one or more components of network portion 700 may perform one or more other tasks described as being performed by one or more other components of network portion 700.

Figure 8:
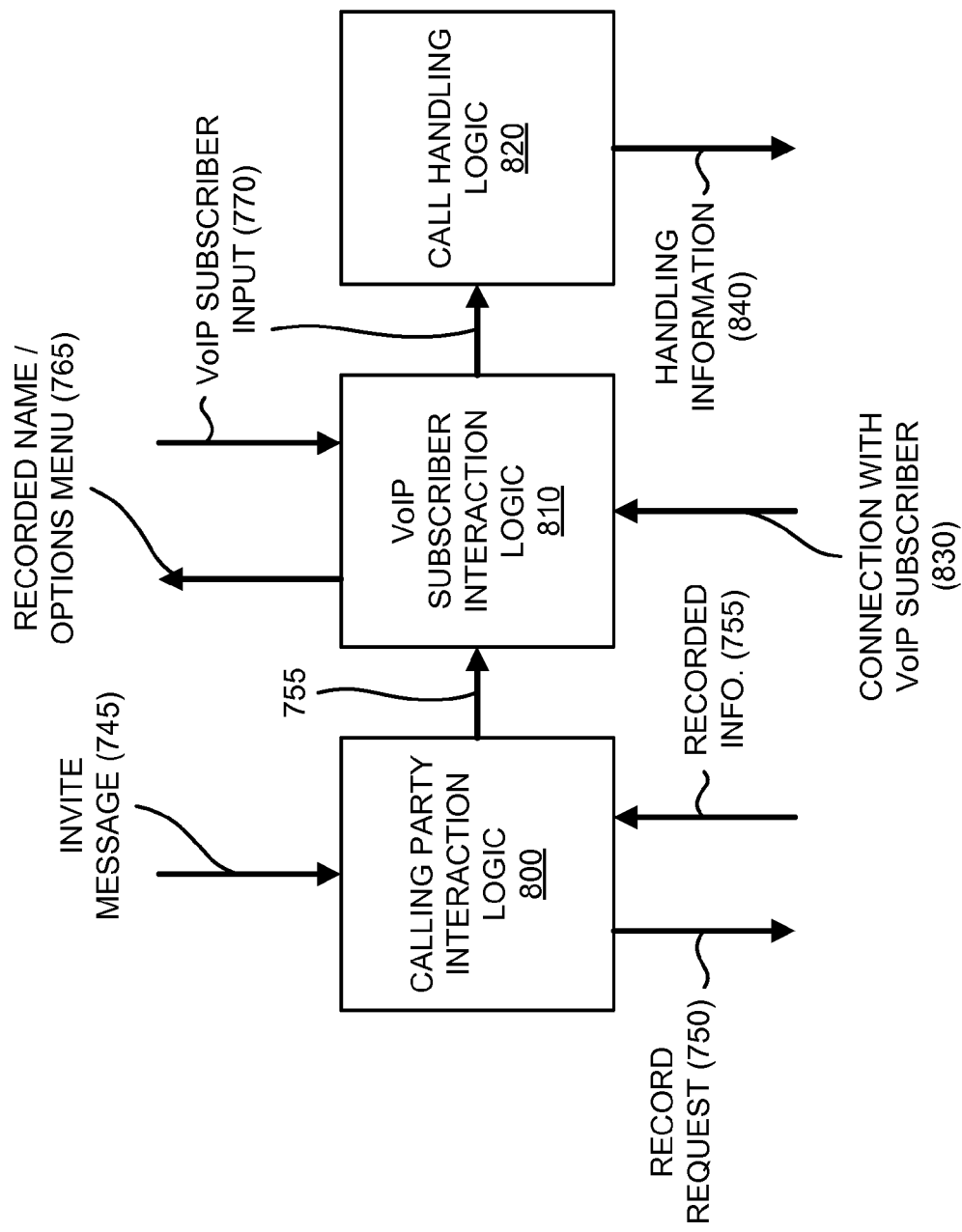
FIG. 8 illustrates a diagram of exemplary functional components of the VoIP media server of the network depicted in FIG. 1.

FIG. 8 illustrates a diagram of exemplary functional components of VoIP media server 160. As illustrated, VoIP media server 160 may include calling party interaction logic 800, VoIP subscriber interaction logic 810, and call handling logic 820. The functions described in FIG. 8 may be performed by one or more of the exemplary components of device 200 depicted in FIG. 2.

Calling party interaction logic 800 may include any hardware and/or software based logic (e.g., processing logic 220) that may enable VoIP media server 160 to receive a message (e.g., message 745), and to generate a request (e.g., request 750) to record information (e.g., a name) associated with a calling party. The calling party may record the requested information (e.g., via calling device 135/170), and calling party interaction logic 800 may receive recorded information 755 (e.g., a recorded name) from the calling party. If the calling party successfully provides recorded information 755 to VoIP media server 160, calling party interaction logic 800 may provide recorded information 755 to VoIP subscriber interaction logic 810.

VoIP subscriber interaction logic 810 may include any hardware and/or software based logic (e.g., processing logic 220) that may enable VoIP media server 160 to receive recorded information 755 from calling party interaction logic 800 and a connection 830 with the VoIP subscriber. VoIP subscriber interaction logic 810 may provide recorded information and/or a menu of options for handling a call (e.g., connect a call, decline a call, route a call to voicemail, etc.), as indicated by reference number 765. The VoIP subscriber (e.g., via VoIP subscriber device 175) may provide input (e.g., input 770) responsive to the menu of options to VoIP subscriber interaction logic 810, and VoIP subscriber interaction logic 810 may provide input 770 to call handling logic 820.

Call handling logic 820 may include any hardware and/or software based logic (e.g., processing logic 220) that may enable VoIP media server 160 to receive input 770 from VoIP subscriber interaction logic 810, and to handle a call based on input 770. In one implementation, call handling logic 820 may generate handling information 840 (e.g., information providing instructions on how to handle a call, such as connect the call, decline the call, route the call to voicemail, etc.), and may provide handling information 840 to components of network 100 for execution. In other implementations, call handling logic 820 may not output handling information 840, and may handle the call itself based on input 770.

Although FIG. 8 shows exemplary functional components of VoIP media server 160, in other implementations, VoIP media server 160 may contain fewer, different, or additional functional components than depicted in FIG. 8. In still other implementations, one or more functional components of VoIP media server 160 may perform one or more other tasks described as being performed by one or more other functional components of VoIP media server 160.

FIG. 9 depicts a flow chart of an exemplary process 900 for providing an AIN-based call intercept service to a VoIP subscriber, according to implementations described herein. In one implementation, process 900 may be performed by AIN SCP 110. In another implementation, some or all of process 900 may be performed by another device or group of devices, including or excluding AIN SCP 110.

As illustrated in FIG. 9, process 900 may begin with receipt of information associated with a call to a VoIP subscriber (block 910), and generation of a query for data associated with the VoIP subscriber and/or the calling party (block 920). For example, in implementations described above in connection with FIG. 4, call determination logic 400 of AIN SCP 110 may receive a translated message (e.g., translated message 315, which may include information associated with call 305) from IP signaling gateway 140, and may generate a query (e.g., query 320) for data associated with a VoIP subscriber and/or the caller based on translated message 315.

As further shown in FIG. 9, data associated with the VoIP subscriber and/or the caller may be received based on the query (block 930), and the call may be screened based on the data associated with the VoIP subscriber and/or the caller (block 940). For example, in implementations described above in connection with FIG. 4, call determination logic 400 may provide query 320 to LIDB SCP 105, and LIDB SCP 105 may return data associated with the caller (e.g., calling name 325 of the calling party) based on query 320. Call determination logic 400 may screen call 305 based on data associated with the VoIP subscriber and/or the caller (e.g., calling name 325), and may provide an indication 420 of whether a call (e.g., call 305) may be completed or intercepted (e.g., based on calling name 325) to response generation logic 410 of AIN SCP 110.

Returning to FIG. 9, if the call can be completed, a message, indicating that the call can be completed, may be generated (block 950), otherwise a message, indicating that call is to be intercepted, may be generated (block 960). For example, in implementations described above in connection with FIG. 4, response generation logic 410 of AIN SCP 110 may receive indication 420 from call determination logic 400, and may generate either a message (e.g., message 330) indicating that a call is to be completed or a message (e.g., message 340) indicating that a call is to be intercepted. Response generation logic 410 may provide message 330 or 340 to IP signaling gateway 140.

FIG. 10 depicts a flow chart of an exemplary process 1000 for providing an AIN-based call intercept service to a VoIP subscriber, according to implementations described herein. In one implementation, process 1000 may be performed by IPe 115 and/or VoIP media server 160. In another implementation, some or all of process 1000 may be performed by another device or group of devices, including or excluding IPe 115 and/or VoIP media server 160.

As illustrated in FIG. 10, process 1000 may optionally begin with receipt of a message indicating that a call to a VoIP subscriber is to be intercepted (block 1010). For example, in implementations described above in connection with FIGS. 7 and 8, calling party interaction logic 800 of VoIP media server 160 may receive a message (e.g., message 745). Message 745 may include information indicating a disposition of call 705 (e.g., that call is to be intercepted).

As further shown in FIG. 10, the call to the VoIP subscriber may be received from the calling party (block 1020), a request for the calling party to record information may be generated (block 1030), and recorded information may be received from the calling party (block 1040). For example, in implementations described above in connection with FIG. 5, calling party interaction logic 500 of IPe 115 may receive a forwarded call (e.g., forwarded call 350), and may generate a request (e.g., request 355) to record information (e.g., a name) associated with a calling party. In implementations described above in connection with FIG. 8, calling party interaction logic 800 of VoIP media server 160 may generate a request (e.g., request 750) to record information (e.g., a name) associated with a calling party.

Returning to FIG. 10, the calling party may be put on hold (block 1050), and a courtesy call to the VoIP subscriber may be generated (block 1060). For example, in implementations described above in connection with FIG. 5, the calling party may record the requested information (e.g., via calling device 135/170), and calling party interaction logic 500 may receive recorded information 360 (e.g., a recorded name) from the calling party. If the calling party successfully provides recorded information 360 to IPe 115, calling party interaction logic 500 may put the calling part on hold, as indicated by reference number 540. Courtesy call generation logic 510 of IPe 115 may receive recorded information 360 from calling party interaction logic 500, and may provide a courtesy call (e.g., courtesy call 365) to the VoIP subscriber (e.g., via VoIP application server 155). In implementations described above in connection with FIG. 8, the calling party may record the requested information (e.g., via calling device 135/170), and calling party interaction logic 800 may receive recorded information 755 (e.g., a recorded name) from the calling party. If the calling party successfully provides recorded information 755 to VoIP media server 160, calling party interaction logic 800 may provide recorded information 755 to VoIP subscriber interaction logic 810.

As further shown in FIG. 10, the recorded information and/or handling options may be provided to the VoIP subscriber via the courtesy call (block 1070), a response to the handling options may be received from the VoIP subscriber (block 1080), and the call may be handled based on the VoIP subscriber response (block 1090). For example, in implementations described above in connection with FIG. 5, VoIP subscriber interaction logic 520 of IPe 115 may provide recorded information and/or a menu of options for handling a call (e.g., connect a call, decline a call, route a call to voicemail, etc.) to the VoIP subscriber, as indicated by reference number 370. The VoIP subscriber (e.g., via VoIP subscriber device 175) may provide input (e.g., input 375) responsive to the menu of options to VoIP subscriber interaction logic 520, and VoIP subscriber interaction logic 520 may provide input 375 to call handling logic 530 of IPe 115. Call handling logic 530 may receive input 375, and may handle the call based on input 375. In implementations described above in connection with FIG. 8, VoIP subscriber interaction logic 810 of VoIP media server 160 may provide recorded information and/or a menu of options for handling a call (e.g., connect a call, decline a call, route a call to voicemail, etc.) to the VoIP subscriber, as indicated by reference number 765. The VoIP subscriber (e.g., via VoIP subscriber device 175) may provide input (e.g., input 770) responsive to the menu of options to VoIP subscriber interaction logic 810, and VoIP subscriber interaction logic 810 may provide input 770 to call handling logic 820 of VoIP media server 160. Call handling logic 820 may receive input 770, and may handle the call based on input 770.

FIG. 11 depicts a flow chart of an exemplary process 1100 for providing an AIN-based call intercept service to a VoIP subscriber, according to implementations described herein. In one implementation, process 1100 may be performed by VoIP application server 155. In another implementation, some or all of process 1100 may be performed by another device or group of devices, including or excluding VoIP application server 155.

As illustrated in FIG. 11, process 1100 may begin with receipt of call to a VoIP subscriber from a calling party (block 1110), and a determination of whether the VoIP subscriber subscribes to or uses a call intercept service (block 1120). For example, in implementations described above in connection with FIG. 6, call analysis logic 600 of VoIP application server 155 may receive a call (e.g., call 305 or courtesy call 365) to a VoIP subscriber, may analyze the VoIP subscriber's services, and may determine whether the VoIP subscriber subscribes to a call intercept service. If the VoIP subscriber subscribes to the call intercept service, call analysis logic 600 may provide a message 630, indicating that the VoIP subscriber subscribes to the call intercept service, to message generation logic 610.

As further shown in FIG. 11, a message, indicating that a call intercept is to be invoked, may be sent when the VoIP subscriber subscribes to the call intercept service (block 1130). For example, in implementations described above in connection with FIG. 6, message generation logic 610 of VoIP application server 155 may receive message 630 from call analysis logic 600, and may generate a message (e.g., SIP SUBSCRIBE message 310) that includes information indicating that the call intercept service should be invoked (e.g., by AIN SCP 110), information about the call that may be needed by the call intercept service (e.g., information, such as a calling party identification, a VoIP subscriber identification, a presentation indication, etc.), etc. Message generation logic 610 may provide SIP SUBSCRIBE message 310 to IP signaling gateway 140.

Returning to FIG. 11, a message indicating to complete the call may be received (block 1140), and the call may be completed between the VoIP subscriber and the calling party (block 1150). For example, in implementations described above in connection with FIG. 6, message receipt logic 620 of VoIP application server 155 may receive a message (e.g., SIP NOTIFY message 335) from IP signaling gateway 140. SIP NOTIFY message 335 may include information indicating a disposition of the call (e.g., that the call is to be completed). Message receipt logic 620 may receive SIP NOTIFY message 335, and may permit the call (e.g., call 305) to be completed between the calling party and the VoIP subscriber, as indicated by reference number 337.

Alternatively, as shown in FIG. 11, a message, indicating that a call intercept is to be invoked, may be received (block 1160), and the call may be forwarded to a PSTN and/or VoIP-based device for handling (block 1170). For example, in implementations described above in connection with FIG. 6, message receipt logic 620 of VoIP application server 155 may receive a message (e.g., SIP NOTIFY message 345) from IP signaling gateway 140. SIP NOTIFY message 345 may include information indicating a disposition of call 305 (e.g., that call is to be intercepted). Message receipt logic 620 may receive SIP NOTIFY message 345, and may forward the call (e.g., call 305) to IPe 115, as indicated by reference number 350.

Implementations described herein may provide an AIN-based call intercept service to a VoIP subscriber. For example, in one implementation, a PSTN-based device may receive information associated with a call destined for a VoIP subscriber, and may generate a query for data associated with the VoIP subscriber. The PSTN-based device may receive data associated with the VoIP subscriber based on the query, and may screen the call (e.g., may generate message indicating that the call is to be completed or that the call is to be intercepted) based on the data associated with the VoIP subscriber. In another implementation, a device (e.g., a PSTN-based device or a VoIP-based device) may receive a call destined for a VoIP subscriber from a calling party, and may generate request for the calling party to record information. The device may receive the recorded information from the calling party, may put the calling party on hold, and may generate a courtesy call to the VoIP subscriber. The device may provide the recorded information and/or handling options to the VoIP subscriber via the courtesy call, may receive a VoIP subscriber response to the handling options, and may handle the call based on the VoIP subscriber response.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9-11, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a first computer device associated with a Voice over Internet Protocol (VoIP) network, information associated with a call from a calling party to a VoIP subscriber;
generating, by the first computer device and based on the information associated with the call, a Session Initiation Protocol (SIP) subscribe message, the SIP subscribe message including: first information requesting a call intercept service, and second information identifying one or more of the calling party or the VoIP subscriber;
forwarding, by the first computer device, the SIP subscribe message to a second computer device associated with a circuit switched network that differs from a VoIP network associated with the VoIP subscriber, the second computer device generating, based on the first information and the second information, a query for third information associated with invoking the call intercept service with respect to at least one of the calling party or the VoIP subscriber; receiving, by the first computer device and from the second computer device, a SIP notify message, the SIP notify message including: the third information, fourth information indicating whether the VoIP subscriber subscribes to the call intercept service, fifth information indicating whether the call intercept service is activated for the VoIP subscriber with respect to the calling party, and a routing number for a third computer device associated with the VoIP network;
providing, by the first computer device and to the VoIP subscriber, the one or more call handling options available with respect to the calling party;
receiving, by the first computer device and from the VoIP subscriber, a response that includes a selection from the one or more call handling options; and
processing, by the first computer device, the call based on the response, processing the call including: forwarding, based on the routing number, the call and information associated with the selection of one of the one or more call handling options to the third computer device.

2. The method of claim 1, further comprising:
generating a message indicating, to one or more of the calling party or the VoIP subscriber, that the call is to be completed or intercepted based on processing the call.

3. The method of claim 1, where the third information associated with the call comprises: information that indicates whether the call intercept service should be invoked; and information associated with the call intercept service.

4. The method of claim 1, where the second computer device includes an advanced intelligent network (AIN) service control point (SCP).

5. The method of claim 1, where
the third computer device provides, to the VoIP subscriber, a message indicating that the call was intercepted and identifying the calling party, and the third computer device provides, to the VoIP subscriber and after providing the message, the call based on receiving an input from the VoIP subscriber to release the call.

6. A method comprising:
receiving, by a first computer device associated with a circuit switched network, information associated with a request, from a calling party, to establish a call to a Voice over Internet Protocol (VoIP) subscriber, the information associated with the request being received from a second computer device associated with a VoIP network associated with the VoIP subscriber, the information associated with the request including a session initiation protocol (SIP) subscribe message that includes: first information requesting a call intercept service, and second information identifying one or more of the calling party or the VoIP subscriber;
generating, by the first computer device and based on the first information and the second information, a query to identify third information identifying one or more call handling options associated with the call intercept service, which are available to the VoIP subscriber with respect to the calling party;
forwarding, by the first computer device and to the second computer device, a SIP notify message, the SIP notify message including: the third information, fourth information indicating whether the VoIP subscriber subscribes to the call intercept service, fifth information indicating whether the call intercept service is activated for the VoIP subscriber with respect to the calling party, and a routing number for a third computer device associated with the VoIP network;
providing, by the second computer device, the one or more call handling options available to the VoIP subscriber with respect to the calling party;
receiving, by the second computer device, a response from the VoIP subscriber, the response including a selection of one of the one or more call handling options; and
handling, by the second computer device, the call based on the selection of the one of the one or more call handling options, handling the call including: forwarding, based on the routing number, the call and information associated with the selection of one of the one or more call handling options to the third computer device.

7. The method of claim 6, further comprising:
placing the calling party on hold after receiving the request to establish the call; and
generating a courtesy call to the VoIP subscriber after placing the calling party on hold, the courtesy call indicating, to the VoIP subscriber, that the calling party is on hold.

8. The method of claim 6, where the second computer device includes at least one of:
an intelligent peripheral provided in a public switched telephone network (PSTN); or a VoIP media server provided in the VoIP network.

9. The method of claim 6, where the one or more call handling options comprise one or more of:
connecting the call to the VoIP subscriber;
declining to establish the call; or
routing the call to a voicemail mail service associated with the VoIP subscriber.

10. A method comprising:
receiving, by a first computer device associated with a Voice over Internet Protocol (VoIP) network and from a calling party, a call destined for a VoIP subscriber;
acquiring, by the first computer device and from a second computer device associated with a circuit switched network that differs from a VoIP network associated with the VoIP subscriber, information identifying whether the VoIP subscriber subscribes to a call intercept service,
acquiring the information including: sending, to the second computer device, a Session Initiation Protocol (SIP) subscribe message, the SIP subscribe message including: first data identifying the call intercept service, and second data identifying the VoIP subscriber, and receiving, from the second computer device, a SIP notify message that includes: third data indicating that the VoIP subscriber subscribes to the call intercept service, fourth data identifying one or more call handling options available to the VoIP subscriber, through the call intercept service, with respect to the calling party, fifth data identifying respective information to be used by the first computer device for each of the one or more call handling options and sixth data identifying a routing number for a third computer device, the third computer device being associated with the VoIP network;
sending, by the first computer device and to the VoIP subscriber, a message indicating that the call intercept service is to be invoked based on receiving the SIP notify message, the message identifying the one or more call handling options available to the VoIP subscriber;
receiving, by the first computer device and from the VoIP subscriber, a selection of one of the one or more call handling options; and
handling, by the first computer device, the call based on the selection, handling the call including: forwarding, based on the sixth data identifying the routing number, the call and information associated with the selection of one of the one or more call handling options to the third computer device.

11. The method of claim 10, where: the first computer device includes a VoIP application server provided in the VoIP network, and handling the call further includes: forwarding the call to a VoIP based device that differs from VoIP application server, the VoIP based device forwarding, to the VoIP subscriber, information identifying the calling party and indicating whether the call is being intercepted.

12. The method of claim 10, where:
the first computer device includes a VoIP application server provided in the VoIP network,
the second computer device includes an advanced intelligent network (AIN) service control point (SCP), and the AIN SCP forms, based on the first data and the second data, a query to identify the third data, the fourth data, and the fifth data from data records, in the circuit switched network, associated with the call intercept service.

13. A device comprising:
a memory to store instructions; and
a processor to execute one or more of the instructions to:
receive information associated with a call from a calling party to a Voice over Internet Protocol (VoIP) subscriber in a VoIP network associated with the device,
generate a Session Initiation Protocol (SIP) subscribe message, the SIP subscribe message including: first information requesting a call intercept service, and second information identifying one or more of the calling party or the VoIP subscriber, translate the SIP subscribe message for transmission, via an internet protocol (IP) signaling gateway, to a computer device associated with a circuit switched network that differs from the VoIP network associated with the VoIP subscriber, the computer device identifying, based on the first information and the second information, third information associated with invoking the call intercept service with respect to at least one of the calling party or the VoIP subscriber, receive, from the computer device and via the IP signaling gateway, a SIP notify message, the SIP notify message including: the third information, fourth information indicating whether the VoIP subscriber subscribes to the call intercept service, fifth information indicating whether the call intercept service is activated for the VoIP subscriber with respect to the calling party, and sixth information indicating a routing number for a computer device associated with the VoIP network, the computer device being different from the device, provide, to the VoIP subscriber and based on the SIP notify message, one or more call handling options available with respect to the calling party, receive, from the VoIP subscriber, a response that includes a selection from the one or more call handling options, and handle the call based on the selection, the processor, when handling the call, being further to: forward, based on the sixth information, the call and information associated with the selection from the one of the one or more call handling options to the computer device associated with the VoIP network.

14. The device of claim 13, where the processor further executes one or more of the instructions to: generate a message indicating that the call is to be completed or intercepted, and forward the message to the VoIP subscriber via the VoIP network.

15. The device of claim 13, where the SIP notify message further includes:

seventh information identifying the one or more call handling options available to the VoIP subscriber, through the call intercept service, with respect to the calling party; and eighth information, associated with at least one of the VoIP subscriber or the calling party, for implementing each of the one or more call handling options.

16. The device of claim 13, where the computer device comprises an advanced intelligent network (AIN) service control point (SCP), and where the AIN SCP forms, based on the first information and the second information, a query to identify the third information from data records, in the circuit switched network, associated with the call intercept service.

17. A device comprising:

a memory to store instructions; and a processor to execute one or more of the instructions to:

receive, from a calling party, a call to a Voice over Internet Protocol (VoIP) subscriber in a VoIP network associated with the device, generate a request, to a computer device associated with a circuit switched network that differs from the VoIP network associated with the VoIP subscriber, for information identifying the calling party and one or more call handling options available to the VoIP subscriber, through a call intercept service, with respect to the calling party, the processor, when generating the request, being further to: form, as the request, a session initiation protocol (SIP) subscribe message that includes: first data identifying the call intercept service, and second data identifying at least one of the VoIP subscriber or the calling party, receive, from the computer device, a SIP notify message that includes: third data indicating whether the VoIP subscriber subscribes to the call intercept service, fourth data identifying the one or more call handling options, fifth data identifying respective information to be used for providing the one or more call handling options, and sixth data identifying a routing number for another device associated with the VoIP network, provide information identifying the one or more call handling options to the VoIP subscriber, receive a response from the VoIP subscriber, the response including a selection of one of the one or more call handling options, and handle the call based on the selection of the one of the one or more call handling options, the processor, when handling the call, being further to: forward based on the sixth data identifying the routing number, the call and information associated with the selection of one of the one or more call handling options to the other device.

18. The device of claim 17, where the selection is associated with putting the calling party on hold, where the other device sends a first message to the VoIP subscriber indicating the calling party is on hold, where the other device receives, from the VoIP subscriber, an instruction to receive the call after the calling party is put on hold, and where, when handling the call, the processor further executes one or more of the instructions to: receive, from the other device and based on the other device receiving the instruction from the VoIP subscriber to receive the call, a second message indicating that the call to the VoIP subscriber is to be connected.

19. The device of claim 17, where, when handling the call, the processor further executes one or more of the instructions to: place the calling party on hold based on receiving the information identifying the calling party and one or more call handling options, generate a courtesy call to the VoIP subscriber after placing the calling part on hold; and provide the information identifying the calling party and one or more call handling options to the VoIP subscriber via the courtesy call.

20. The device of claim 17, where the device comprises one of:

an intelligent peripheral provided in the VoIP network; or a VoIP media server provided in the VoIP network.

21. The device of claim 17, where the one or more call handling options comprise one or more of:

a first option related to connecting the call to the VoIP subscriber;

a second option related to declining the call; or a third option related to routing the call to a voicemail service associated with the VoIP subscriber.

* * * * *